US006484856B1

(12) United States Patent
Gratzer

(10) Patent No.: US 6,484,856 B1
(45) Date of Patent: Nov. 26, 2002

(54) SPEED-DIFFERENCE-DEPENDENT HYDRAULIC COUPLING WITH CONTROL VALVES

(75) Inventor: Franz Gratzer, Stallhofen (AT)

(73) Assignee: Steyr-Daimler-Puch Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 09/689,198

(22) Filed: Oct. 12, 2000

(30) Foreign Application Priority Data

Oct. 12, 1999 (AT) .......................................... 703/99 U

(51) Int. Cl.[7] .............................................. F16D 43/28
(52) U.S. Cl. ...................................... 192/35; 192/103 F
(58) Field of Search ............................ 192/57, 103 F, 192/35, 85 AA

(56) References Cited

U.S. PATENT DOCUMENTS

| 3,800,930 | A | * | 4/1974 | Sommer ................. 192/104 F |
| 3,894,446 | A | * | 7/1975 | Snoy et al. .................... 74/711 |
| 4,581,895 | A | * | 4/1986 | Kress .......................... 60/485 |
| 4,727,966 | A | * | 3/1988 | Hiramatsu et al. ........ 192/0.033 |
| 4,924,989 | A | * | 5/1990 | Filderman ............... 192/103 F |
| 5,197,583 | A | * | 3/1993 | Sakai et al. .................... 192/35 |
| 5,536,215 | A | | 7/1996 | Shaffer et al. |
| 5,611,746 | A | * | 3/1997 | Shaffer ......................... 475/88 |
| 5,827,145 | A | * | 10/1998 | Okcuoglu ..................... 475/88 |
| 5,964,126 | A | | 10/1999 | Okcuoglu |
| 6,120,408 | A | * | 9/2000 | Yates, III et al. ............ 475/231 |
| 6,196,368 | B1 | * | 3/2001 | Eibler .......................... 192/35 |
| 6,250,444 | B1 | * | 6/2001 | Gratzer ........................ 192/35 |

FOREIGN PATENT DOCUMENTS

| DE | 198 54 867 A1 | 6/1999 |
| EP | 0926378 | 6/1999 |

* cited by examiner

Primary Examiner—Rodney H. Bonck
Assistant Examiner—Saúl Rodríguez
(74) Attorney, Agent, or Firm—Magna International of America, Inc.; Robert F. McBeth

(57) ABSTRACT

A speed-difference-dependent hydraulic, consisting of a stationary rotating gear housing (27) with a housing (25) which forms a reservoir for operating fluid, a hydrostatic displacement machine (35), a drive shaft (30), a friction coupling (36) and a piston (5) to have an impact on the friction coupling (36), by which pressure is created in a pressure chamber (4) when there is a differential speed between the gear housing (27) and the drive shaft (30). In order to achieve quick regulation and adaptation of the characteristics, a first and second opening (9, 10) are connected by means of a first and second rotating insertion (13, 14), and a first and second regulating control valve (15, 16) are connected with the reservoir (8), by which the first and the second control valves (15, 16) are formed as regulating throttle valves, so that independent of the direction of the differential speed, it can be controlled on the respective supply side as well as on the discharge side of the displacement machine.

9 Claims, 4 Drawing Sheets

US 6,484,856 B1

SPEED-DIFFERENCE-DEPENDENT HYDRAULIC COUPLING WITH CONTROL VALVES

BACKGROUND OF INVENTION

1. Field of Invention

The invention relates to a speed-difference-dependent hydraulic coupling, consisting of a rotating gear housing which is stationary, a housing which forms a reservoir for operating fluid, a hydrostatic displacement machine in the gear housing, a drive shaft, and a friction coupling to connect the drive shaft with the gear housing and a piston to have an impact on the friction coupling, by which pressure is created in a pressure chamber when there is a differential speed between the gear housing and the drive shaft, which influences an impact on the friction coupling, and by which the hydrostatic displacement machine is provided with a first and second opening for the supply and discharge of operating medium and a third and fourth opening for connection with the pressure chamber.

2. Description of the Prior Art

These type of couplings are being applied in various configurations in the motive power line of motor vehicles to directly transfer a torque or to block a connected differential power transmission to drive the wheels of an axle or for distribution of the starting torque between two axles. The hydrostatic displacement machine consists, for example, of an internal rotor and an external rotor. However, hydrostatic displacement machines of other types of construction can also be used. In any case when there is a differential speed, two parts (e.g. drive housing and output shaft) perform a relative motion and create an impacting pressure on the pistons of the friction coupling.

This type of coupling is renowned, for example, from U.S. Pat. No. 5,536,215. In this case, a valve of a bimetallic laminar will be provided between the pressure chamber and a space with lesser pressure, i.e. the coupling area. This valve shall compensate viscosity changes of the operating fluids, which depend on the temperature. Other regulating devices will not be provided.

As disclosed in U.S. Pat. No. 4,727,966 (hereinafter "'966"), another such coupling in a slightly different arrangement is renowned. In this type of coupling, discharge openings with restrictors will be provided between the third and fourth openings and the pressure chamber. These discharge openings enable different set pressures for the two possible directions of the differential speed, i.e. a difference between the driving and delayed operations, or forwards and reverse speeds.

Furthermore, as shown in FIG. 7 of the '966 reference, regulating devices are already provided, i.e. more discharge valves, the set pressure of which can be regulated. The adjusting signal for this will be determined by a control device of different operating sizes. The control devices are installed in the rotating part. Thus, the adjusting signals, in this case hydraulic, must be fed to them by a rotating entry. The pressure on the suction side of the displacement machine will not be influenced. All of this and in addition the impact of the centrifugal force on the regulating devices makes a delicately sensitive, exact and quick regulation impossible.

In German Patent Document Number DE 198 54 867 A, another similar coupling is renowned in another arrangement, by which the pressure chamber itself, rather than the displacement machine, is connected by a rotating entry with a control valve equipped with a rigid housing for pressure modulation on the pressure side. In this way only an imperfect control is possible. Therefore, in order to tow the motor vehicle, the displacement machine must be made completely pressureless, which necessitates a valve on the suction side. Furthermore, the valve arrangement requires the coupling unit to be constructed in such a way that it has a number of other disadvantages.

The aim of this invention is to further develop a coupling which is of a kind that ensures a delicately sensitive, exact and quick regulation and adaptation of the characteristic with at least expense as possible.

SUMMARY OF INVENTION

The above aim of the invention is achieved in that the streams of the first and second openings, respectively, are connected to the reservoir by a first and second rotating entry and a first and second valve with rigid housings, and that the first and second valves are formed as regulating throttle valves, so that independent of the direction of the differential speed, there will be a control action on the supply as well as on the discharge side of the displacement machine.

Therefore, control valves will be provided at the shortest way to and from the displacement machine on the pressure and suction sides, which have direct impact on the coupling with very little delay in all driving conditions possible. Since these are controllable throttle valves, i.e. arranged in the main stream, it is possible to control over the entire regulating range in a delicately sensitive and exact manner.

There are also the following advantages of the arranged control valves in rigid housings; simple connection with the control device, no disturbing influences of the centrifugal force, no restrictions of the size and good access. Furthermore, due to these advantages, the supply and discharge of the operating medium is possible on the side of the displacement machine, so that the rotating insertions could be provided relatively simple at small diameters. The additional costs for the rotary transmission is made competitive due to the omission of the necessary non-return valves without both control valves in the same line.

In one embodiment of this invention, the first and the second valve forms a common control valve. Apart from the reduction in costs in this connection, improvement of the reliability without any loss in the function capability in the driving operation is also achieved. During this, the first and second valves could be controlled by proportional valves or by a stepping motor.

In a further embodiment of this invention, a double-acting non-return valve will be provided between the third and fourth openings and the pressure chamber. Due to the fact that one side is always open at this valve, the pressure chamber above this valve and the regulating valve can be made pressureless very quickly, which is of an advantage especially when braking (ABS, ESP). Furthermore, the valve can be installed in the wall between the displacement machine and the pressure chamber which especially saves space. Acceptable transition from one type of operation to the other is ensured by the fact that there is only one valve with one circuit element (preferably with a ball).

An advantage of this invention is that the common control valve is formed by a movable adjusting piston in a sleeve. The sleeve is connected to the streams of the reservoir on both sides and has a first and second lateral control opening. The pressure side of the displacement machine is connected with the first control opening and the suction side of the displacement machine is connected with the second control opening.

During operation, the adjusting pistons close the first and the second control openings in its two end positions and more or less close the two control openings in the two intermediate positions in countercurrent. Due to this, the rate of opening and closing of both valves is achieved with less construction costs. Space efficiency and accessibility are further improved if the sleeves of the control valve have a plane arrangement transversal to the revolution axis of the coupling in the area of the rotating insertions.

Another advantage of this invention is that the double-acting non-return valve consists of a tangential bore in a plane arrangement transversal to the revolution axis of the coupling and a locking device therein between the displacement machine and the pressure chamber. Both ends of the tangential bore are connected to the third and fourth openings of the displacement machine and its center point to the pressure chamber. In this way the valve is not influenced by the centrifugal force in case of minimal space requirement.

DETAILED DESCRIPTION OF THE INVENTION

Figure 1:
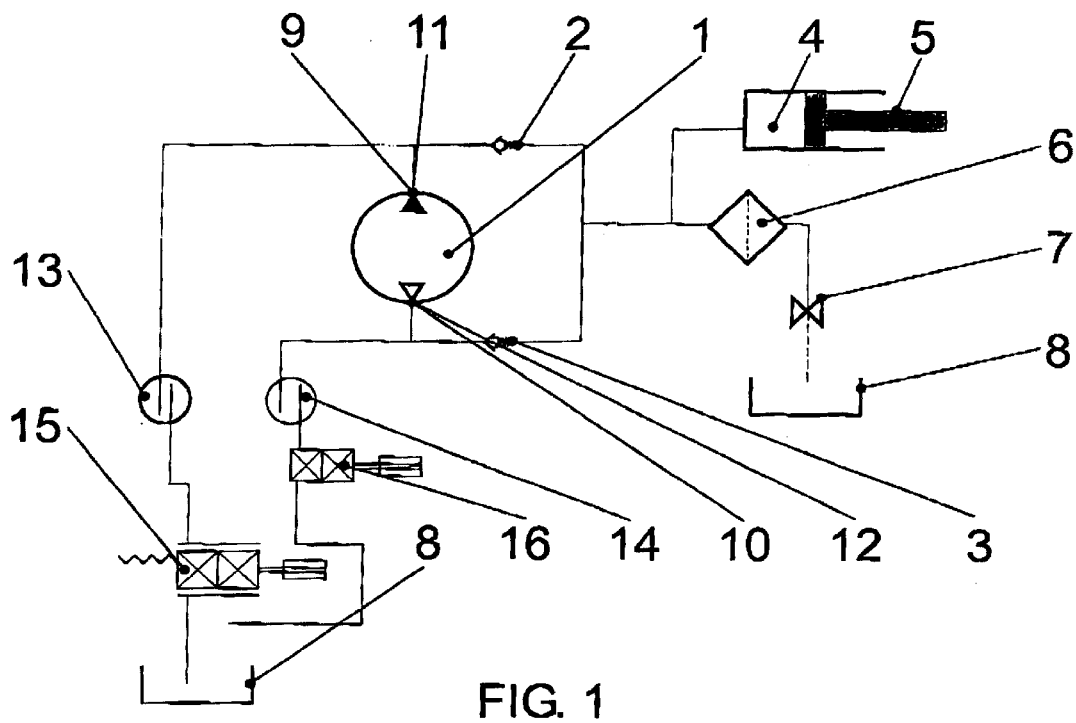
FIG. 1 is a schematic diagram of a coupling according to this invention.

FIG. 1 is a schematic diagram of a coupling according to this invention. The coupling includes a hydrostatic displacement machine 1 having four openings 9, 10, 11, and 12. Openings 9 and 11 are connected to a pressure chamber 4 via a non-return valve 2. Openings 10 and 12 are connected to the pressure chamber 4 via a non-return valve 3. The pressure chamber 4 presses together a lamella coupling not yet illustrated here, via a piston 5. The connection to a reservoir 8 is made via a throttle valve 7 and if necessary, via a filter 6. The opening 9 is connected to a first control valve 15 via a first rotating insertion 13. The opening 10 is connected to a second control valve 16 via a second rotating insertion 14.

Figure 2:
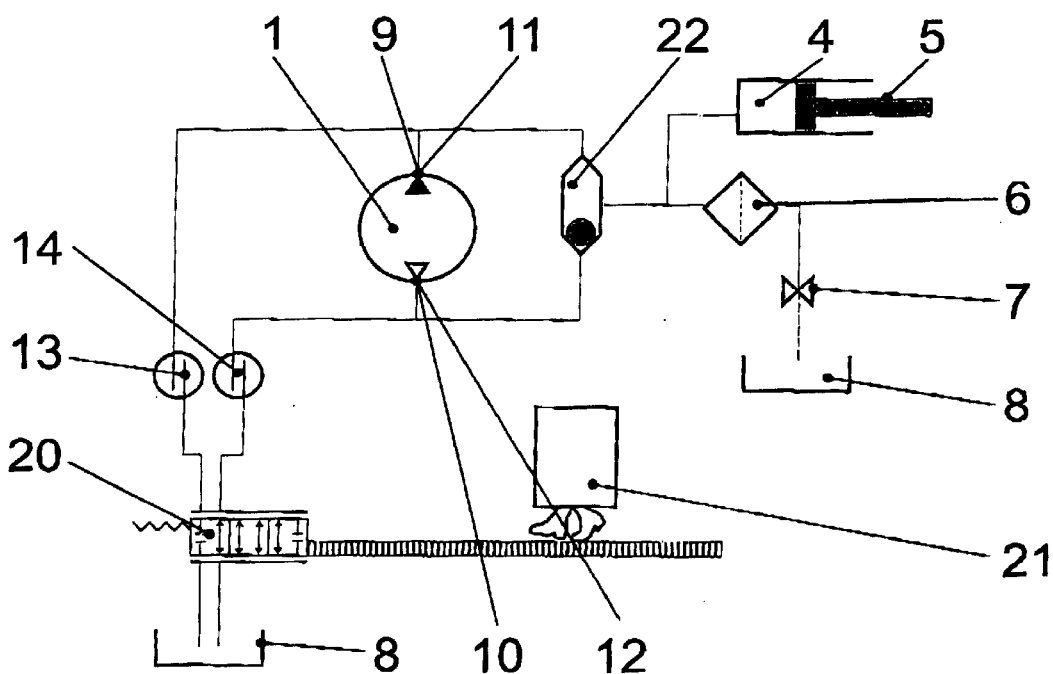
FIG. 2 is a schematic diagram of another embodiment of a coupling according to this invention.

The coupling as shown in FIG. 2 differs from the coupling shown in FIG. 1. in that the two control valves 15, 16 are replaced by a common control valve 20 and the non-return valves 2, 3 are replaced by a common double non-return valve 22. The common control valve 20 is controlled by a stepping motor 21.

Figure 3:
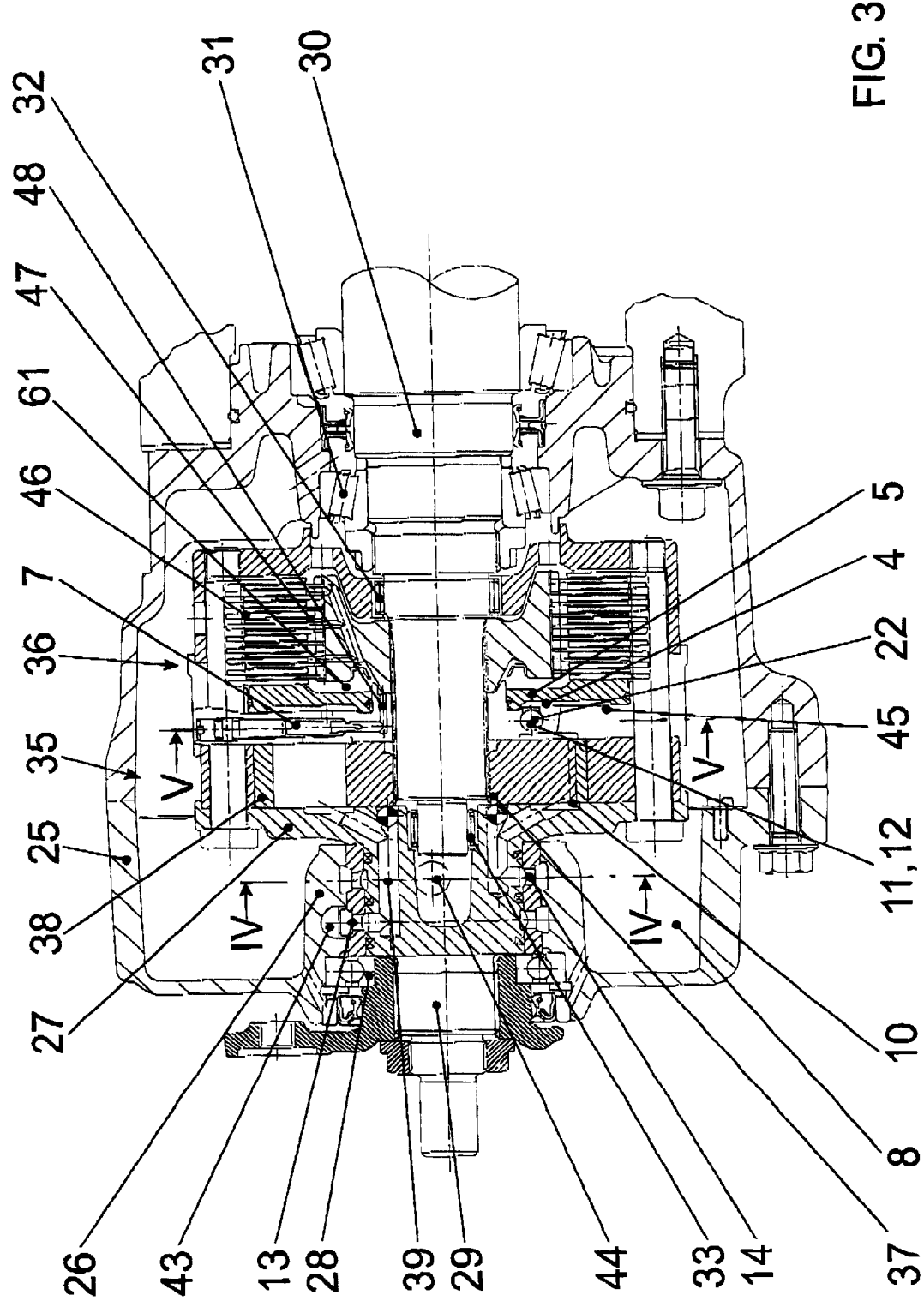
FIG. 3 is a longitudinal section view of an embodiment of a coupling according to this invention.

As shown in FIG. 3, a coupling according to this invention, includes a housing which defines a reservoir 8 for operating fluid and a connecting flange with 26. Inside the latter there is a gear housing 27, which discharges into a drive shaft 29, which is directed by means of a bearing 28 into the housing 25 in a rotating motion. On the side of the drive shaft 29, there is an output shaft 30 which protrudes into the gear housing 27. It is stored in a housing 25 by means of bearing 31. Between the gear housing 27 and the output shaft 30, two needle bearings 32, 33 will be provided to support each other.

In the inner part of the gear housing 27, there is a displacement machine, generally marked with 35 and a friction clutch which is a lamella coupling of renowned construction. The hydrostatic displacement machine 35 consists here of an internal rotor 37, which is connected with torsional strength with the output shaft 30, and an external rotor 38 which is eccentric rotating freely in the gear housing. Both rotors 37, 38 show teeth-like formations in various numbers which mesh with one another.

In the gear housing 27 there are a first and second openings 9, 10 on the side away from the friction coupling 36 and on the side facing the friction coupling 36, the third and fourth openings 11, 12. From the first opening 9 there is a first connection bore (or more consecutive bores) 39 to a first rotating insertion 13 between gear housing 27 and housing 25. From the second opening 10, there is a second connection bore 41 to a second rotating insertion 14, which is displaced to the first rotating insertion.

From both rotating insertions 13, 14, a first cross-intersecting canal 43 and a second cross-intersecting canal 44 lead to common control valve 20 (not illustrated), which is arranged in the connecting flange 26 of housing 25, i.e. not in the rotating part. The third and fourth openings 11, 12 are in an intermediate plate 45, which is part of the gear housing 27 and is connected directly to the hydrostatic displacement machine 35. The common non-return valve 22 and the throttle valve 7 is also in the intermediate plate 45.

On the intermediate plate 45 of the side away from the hydrostatic displacement machine, there is first pressure chamber 4 and then piston 5, which presses together the coupling lamella 46, 47 in case of impact of pressure chamber 4. The coupling lamella 46 is connected with the gear housing 27 and the coupling lamella 47 with the output shaft 30 with torsional strength but are adjustable axial.

Figure 4:
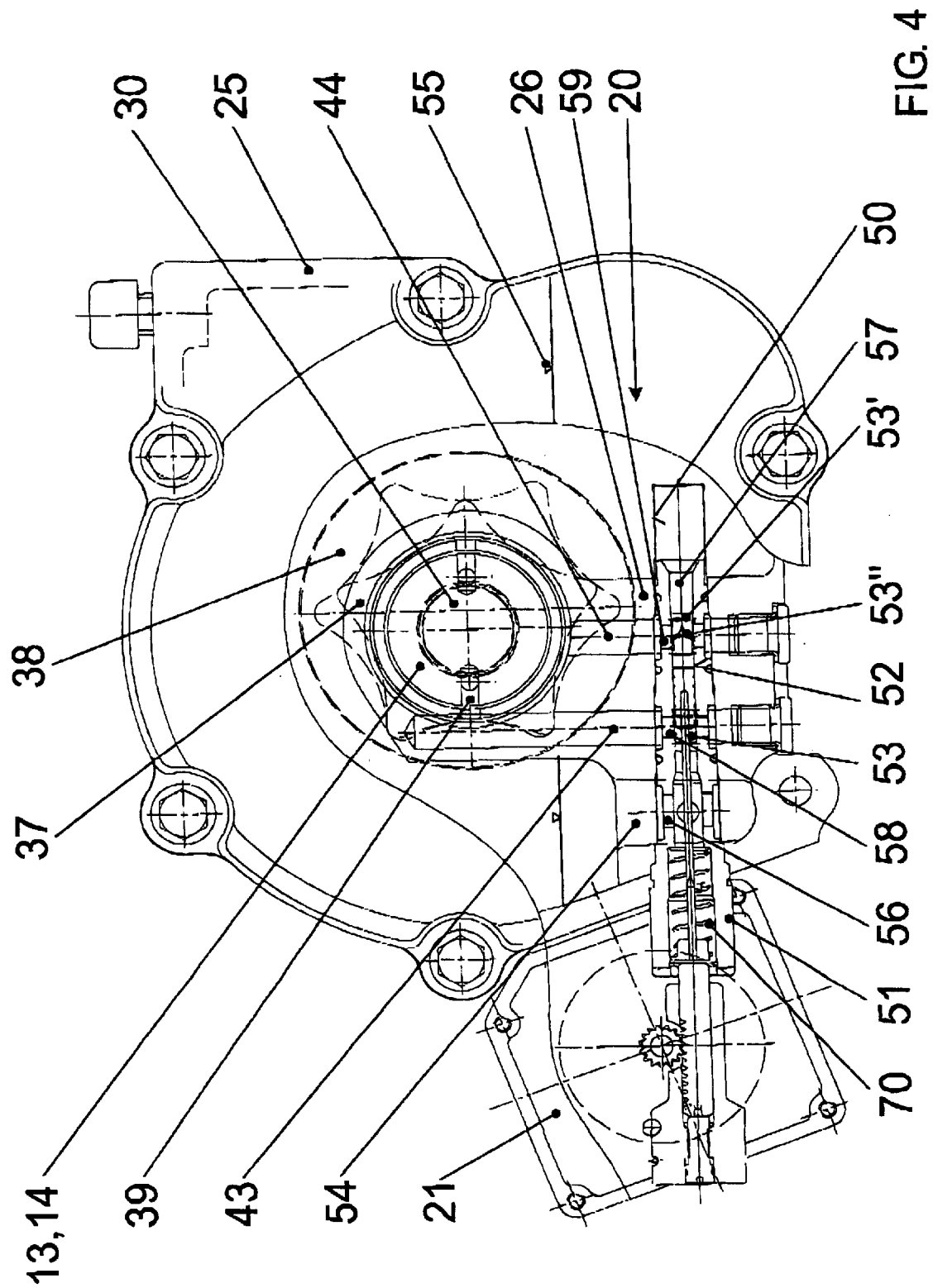
FIG. 4 is a partially open front view of an embodiment of a coupling according to this invention.

In FIG. 4 the common control valve 20 can especially be seen, which is installed in a valve bore 50 in connecting flange 26. It is in an installed sleeve 51 which is bolted in a valve bore 50 with a cylindrical bore 52, in which an adjusting piston 53 is adjustable by means of a stepping motor 21. The connecting flange 26 shows an indentation 54, through which there is a connection to the operating fluid in the reservoir on one side by means of a first access opening 56, possibly by means of a filter. At the other end of the sleeve 51, the operating fluid can freely flow to the cylindrical bore 52 by means of a second access opening 57. The approximate oil level is indicated and marked with 55.

Between both access openings 56, 57, sleeve 51 shows two lateral control openings. The first control opening 58 is connected with the first cross-intersecting canal 43, the second control opening 59 with the second cross-intersecting canal 44 (refer to FIG. 3). Control openings 58, 59 must not necessarily be cylindrical. They can be adapted to refined control demands by means of deviating forms.

Furthermore, a spring 70 will be provided which will bring piston 53 in the extreme position indicated on the left automatically in special situations.

The function of the valve 22 will now be explained on the basis of the three indicated positions of the adjusting piston 53. In position 53 (full line), the first control opening 58 is entirely closed, the second control opening 59 is entirely open. In position 53 (dotted line), the first control opening 58 is entirely open and the second control opening 59 is totally closed. In the position 53" (dotted line), both control openings 58, 59 are partly open. The effect of these valve positions depends on the direction of the differential speed in the hydrostatic displacement machine, and thus, the driving condition.

A) Pulling operation forwards: The adjusting piston is in the central position 53". The second control opening 59 is (more or less) open; it acts as a suction opening. The first control opening 58 is also partly open; it is the pressure opening. The adjusting pistons are in position 53". In this position the characteristic of the coupling is gentle, e.g. for manoeuvring and by driving curves on the roads. If the coupling gets stiff for higher tractions, i.e. transmit a higher moment, possibly in terrains or by wheel spins, the adjusting piston will be brought in position 53, in which the first control opening 58 is connected.

B) Thrust motion forwards: In case of thrust braking, the first control opening 58 is open (it is now the pressure side) and the second control opening 59 is closed as far as possible. The adjusting piston is in position 53".

If braking is effected with ABS, the second control opening 59 opens quickly, which is supported by the spring. The adjusting piston is then in position 53.

C) Pulling reverse: The second control opening 59 is closed. The first control opening 58 is open. The adjusting piston is between positions 53' and 53" in case of standard operation.

D) Thrusting reverse: Both openings 58, 59 are partly open, according to the position of the adjusting piston 53".

E) Towing forwards: The first control opening must be open and the second control opening 59 (according to the suction side) must be closed as far as possible, so that there is no towing resistance during towing.

Figure 5:
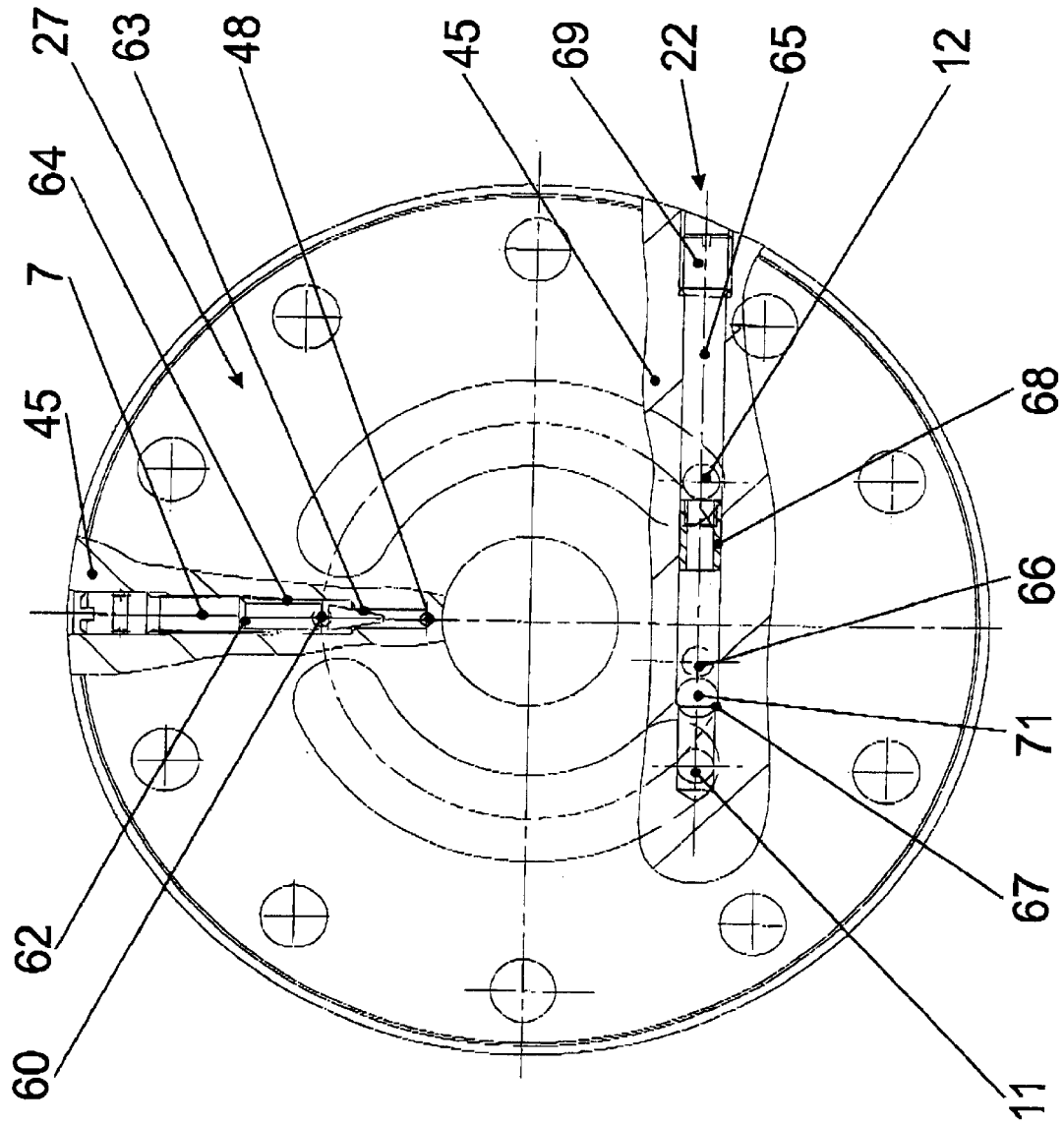
FIG. 5 is a partially open front view of an intermediate plate shown in FIG. 3.

FIG. 5 shows two other valves, the throttle valve 7 and the common double-acting non-return valve 22. Both are installed in the intermediate plate 45 (refer also to FIG. 3). From the pressure chamber 4, the pressure medium streams through the connecting hole 60 into the throttle valve bore 64, in which the throttle pin 62 is bolted and adjustable. This forms a restrictor 63 with the throttle valve bore 64. The inner part of the restrictor is connected to a cooling pipe 48 which leads into the coupling area (FIG. 3).

The common non-return valve consists of a tangential bore 65 which is tightly closed at one end with a plug (69), and a movable locking device 71. The third and fourth openings 11, 12 of the hydrostatic displacement machine 35 discharge into the tangential bore 65.

Between these openings 11, 12 there is a stop shoulder 67 and on the other side a bolted stop ring 6. Between both of these bearing surfaces 67, 68, the locking device 71, in this case a ball, can move back and forth.

Approximately in the middle, between the two end positions of the locking device 71, there is an opening 66, which creates a connection to the pressure chamber 4. Depending on which of the two openings 11, 12 have the higher pressure, the ball 71 goes into a position, in which one of the two openings 11, 12 is connected to the access opening 66. In this way the double-acting non-return valve 22 is created.

What is claimed:

1. A coupling comprising:
   a stationary housing (25) which forms a reservoir for operating fluid,
   a rotating gear housing (27) disposed in the stationary housing (25),
   a hydrostatic displacement machine (35) disposed in the gear housing (27),
   a drive shaft (30),
   a friction coupling (36) interconnecting the drive shaft (30) with the gear housing (27),
   a piston (5) to have an impact on the friction coupling (36) for creating pressure in a pressure chamber (4) when there is a differential speed between the gear housing (27) and the drive shaft (30),
   the hydrostatic displacement machine (35) is provided with a first opening (9) and a second opening (10) for the supply and discharge of operating fluid and a third opening (11) and fourth opening (12) for connection with the pressure chamber (4),
   the coupling being characterized by the first and second openings (9, 10), being connected by means of a first and second rotating insertion (13, 14), respectively, and a first and second control valve (15, 16), with rigid housings and are formed as regulating throttle valves, so that independent of the direction of the differential speed, coupling can be controlled on the respective supply side as well as on the discharge side of the displacement machine.

2. A speed-difference-dependent hydraulic coupling according to claim 1, characterized by the first and second control valves (15, 16) forming a common control valve (20).

3. A speed-difference-dependent hydraulic coupling according to claim 1, characterized by the first and second control valves (15, 16) being proportional valves.

4. A speed-difference-dependent hydraulic coupling according to claim 1, characterized by the first and second control valves (15, 16; 20) being controlled by a stepping motor (21).

5. A speed-difference-dependent hydraulic coupling according to claim 1, characterized by the fact that between the third and fourth openings (11, 12) and the pressure chamber (4), a double-acting non-return valve (22) will be provided.

6. A speed-difference-dependent hydraulic coupling according to claim 5, characterized by the displacement machine (35) being connected via a throttle valve (7) and a cooling pipe (48) to the coupling area (61).

7. A speed-difference-dependent hydraulic according to claim 2, characterized by the common control valve (20) being formed by a movable adjusting piston (53) in a sleeve (51), by which the sleaves is provided with access openings (56, 57) on both sides to the reservoir (8) and a first (59) and second (58) lateral control opening (58, 59), from which the one (59) with the second (57) and the other (58) with the first access opening (56) (pressure side and suction side) are connected to the displacement machine (35) wherein the adjusting piston (53) closes respectively the first (59) and the second (58) control openings in both its end positions (53',53 ), and partially closes both control openings (58, 59) in the intermediate positions (53').

8. A speed-difference-dependent hydraulic according to claim 7, characterized by the sleeve (51) of the control valve (20) in a plane arrangement transversal to the revolution axis of the coupling in the area of the rotating insertions (13, 14).

9. A speed-difference-dependent hydraulic according to claim 5, characterized by the double-acting non-return valve (22) consisting of a tangential bore (65) in a plane arrangement transversal to the revolution axis of the coupling and a locking device (71) therein between the displacement machine and the pressure chamber, both ends of the tangential bore (65) are connected to the third and fourth openings (11, 12) of the displacement machine (35) and its center point to the pressure chamber (4).

\* \* \* \* \*